Patented Mar. 4, 1952

2,587,906

UNITED STATES PATENT OFFICE 2,587,906

PREPARATION OF HYDROXY-CARBOXYLIC-ACIDS

Hans Schmidt, Wuppertal-Vohwinkel, Germany, assignor to Schenley Laboratories, Inc., New York, N. Y., a corporation of Delaware No Drawing. Application November 17, 1949, Serial No. 128,024. In Germany October 20, 1948

14 Claims. (Cl. 260—528)

This invention relates to the production of polyhydroxymonocarboxylic acids and more particularly to a catalytic process for the oxidation of sugars.

It is known that the oxidation of reducing sugars with oxygen or air in an alkaline solution can be carried out in such a manner that a polyhydroxymonocarboxylic acid having one less carbon atom, is obtained as the chief reaction product. For this purpose, oxygen or air in very finely distributed form is caused to react upon the monosaccharides in an alkaline solution.

Since the yield obtained according to the above process is unsatisfactory I have made efforts to influence the reaction by adding catalysts. Although the usual catalysts, e. g. metals, partly accelerate the oxidation process they have proved not to promote the formation of polyhydroxymonocarboxylic acids but to influence the oxidation in a different direction.

I have now found that certain organic compounds definitely promote the formation of polyhydroxymonocarboxylic acids, increasing the yield of these acids and reducing the formation of by-products. Such compounds are dyestuffs of the thiazine-series, amongst which especially methylene blue is distinguished by an excellent catalytic action; also compounds of the oxazine and phenazine series have proved to be operative. The addition of small amounts of such substances suffices to catalyze the oxidation reaction in a manner such as to achieve substantial increases in the yield.

The following example serves to illustrate the action of the catalysts of this invention:

150 grams of saccharose are dissolved in 1200 ccs. of water, the solution obtained is inverted after the addition of some hydrochloric acid and thereupon filled into a glass tube of 75 mm. diameter. Oxygen is introduced from below in a vigorous current through a clay filter candle. From a dropping funnel a solution of 147.5 grams of caustic potash in 950 ccs. of water is added by drops within 2 hours. The temperature rises spontaneously and is then kept at 40–42° C. Oxygen is passed through for another 2 hours and then air for a further 4 hours. The progress of the oxidation can be tested, for instance, by titration. After completion of the oxidation the working up may be carried out as follows:

The solution is neutralized with glacial acetic acid and reduced in vacuo to a small volume. The potassium arabonate formed crystallizes. For completing the precipitation methanol may be added. The reaction product isolated by sucking off and washing with methanol is dried.

The following table gives a summary of the yields obtained in accordance with this invention while using different catalytically active substances.

In order to complete the comparative tests according to the above schedule some of the experiments listed in the following table were carried out with air exclusively and some others with oxygen exclusively.

| No. | Catalyst | Quantity of the catalyst used | Time of introducing— oxygen | Time of introducing— air | Yield of arabonate of potassium in grams (theory 180 grams) |
|---|---|---|---|---|---|
| | | | hours | hours | |
| 1 | Control | 0 | 9 | | 117.5 |
| 2 | ---do--- | 0 | 4 | 4 | 117 |
| 3 | ---do--- | 0 | | 8 | 96 |
| 4 | Methylene blue tetramethyldiamino-diphenazo-thionium chloride) Schultz No. 1038. | 1 gram | 4 | 4 | 148 |
| 5 | ---do--- | 1 gram | 4 | 4 | 150 |
| 6 | ---do--- | 0.5 gram | 4 | 4 | 142.5 |
| 7 | ---do--- | 0.1 gram | 4 | 4 | 129 |
| 8 | ---do--- | 1 gram | 8 | | 147 |
| 9 | ---do--- | 1 gram | | 8 | 140 |
| 10 | Methylene green (tetramethyldiamino-nitro-diphenazo-thionium chloride) Schultz No. 1040. | 1 gram | 4 | 4 | 129 |
| 11 | Methylene violet (amino-dimethylamino-phenyl-diphenazonium chloride) Schultz No. 959. | 1 gram | 4 | 4 | 131 |
| 12 | Thionine blue (trimethyl-ethyldiamino-diphenazo-thionium chloride) Schultz No. 1042. | 1 gram | 4 | 4 | 143 |
| 13 | Lauth's violet (diaminodiphenazo-thionium chloride) Schultz No. 1036. | 1 gram | 4 | 4 | 126.5 |
| 14 | Celestine blue (diethylamino-dihydroxy-carboxy-diphenazoxonium chloride) Schultz No. 1021. | 1 gram | 4 | 4 | 130 |
| 15 | Rosinduline GG (sodium salt of the azine dye, rosindone) Schultz No. 950. | 1 gram | 4 | 4 | 127.5 |

It follows from this table that on working in accordance with my invention the yield of polyhydroxymonocarboxylic acids is considerably increased. The best result is obtained by using methylene blue as catalyst. The efficiency of the catalyst is not only proved on using oxygen exclusively or on subsequently completing the oxidation with air but also on using air exclusively. This means a substantial economy in oxygen when working on a technical scale since a considerable part of the oxygen passes through unused. Without using catalysts yields are obtained with air which are far below those obtained with oxygen or with oxygen and air (cf. tests 1, 2 and 3).

The melting points (with decomposition) of the products obtained according to the invention are between 215 and 220° C. On conversion into calcium arabonate good yields are obtained. Only a slight amount of insoluble calcium salt (calcium oxalate) is formed owing to the fact that the formation of by-products of the oxidation process is substantially reduced. Any adhering residues of catalysts as far as these have not been washed out with methanol can easily be removed, for instance, by means of animal charcoal.

For the purpose of comparison the tests enumerated in the above table have been carried out in the same manner. However, it is also feasible to vary the conditions of the oxidation and working up within a wide range, not only as to temperature, time, concentration etc. but also, for instance, as to the amount and kind of the alkali used.

I claim:

1. In the process of oxidizing reducing sugars to yield the corresponding polyhydroxymonocarboxylic acids with one carbon atom less than the sugar employed with oxygen containing gases in an alkaline medium, the step which comprises adding to the solution of the sugar a compound selected from the group consisting of methylene blue and its analogs of the thiazine-, oxazine-, and phenazine-series.

2. In the process of oxidizing inverted saccharose to yield arabonic acid with oxygen containing gases in an alkaline medium, the step which comprises adding to the solution of said inverted saccharose a compound selected from the group consisting of methylene blue and its analogs of the thiazine-, oxazine-, and phenazine-series.

3. In the process of oxidizing inverted saccharose to yield arabonic acid with oxygen containing gases in an alkaline medium, the step which comprises adding to the solution of said inverted saccharose a small amount of methylene blue.

4. In the process of oxidizing inverted saccharose to yield arabonic acid with air in an alkaline medium, the step which comprises adding to the solution of said inverted saccharose a small amount of methylene blue.

5. In the process of oxidizing inverted saccharose to yield arabonic acid with oxygen in an alkaline medium, the step which comprises adding to the solution of said inverted saccharose a small amount of methylene blue.

6. In a process for the production of aliphatic polyhydroxymonocarboxylic acids by oxidation, with an oxygen-containing gas, of a reducing sugar with oxygen in an aqueous alkaline reaction medium, the improvement that comprises performing this oxidation while having present in the reaction medium, a catalytically effective amount of catalyst comprising a substance of the group consisting of methylene blue and its analogs of the thiazine, the oxazine and of the phenazine series.

7. A process as defined in claim 6 wherein the sugar is inverted sucrose and the catalyst is a thiazine dye.

8. A process as defined in claim 7 wherein the thiazine dye is methylene blue.

9. A process as defined in claim 7 wherein the thiazine dye is methylene green.

10. A process as defined in claim 7 wherein the thiazine dye is methylene violet.

11. A process as defined in claim 6 wherein the sugar is inverted sucrose and the catalyst is an oxazine dye.

12. A process as defined in claim 11 wherein the oxazine dye is Celestine blue, Schultz No. 1021.

13. A process as defined in claim 6 wherein the sugar is inverted sucrose and the catalyst is a phenazine dye.

14. A process as defined in claim 13 wherein the phenazine dye is rosinduline.

HANS SCHMIDT.

REFERENCES CITED

The following references are of record in the file of this patent:

UNITED STATES PATENTS

| Number | Name | Date |
| --- | --- | --- |
| 2,190,377 | Dalmer et al. | Feb. 13, 1940 |
| 2,207,738 | Hudson et al. | July 16, 1940 |

FOREIGN PATENTS

| Number | Country | Date |
| --- | --- | --- |
| 618,164 | Germany | Sept. 3, 1935 |
| 620,248 | Germany | Oct. 17, 1935 |

OTHER REFERENCES

Moruzzi, Chem. Abstracts, vol. 31, col. 8560 (1937).